Figure 1:
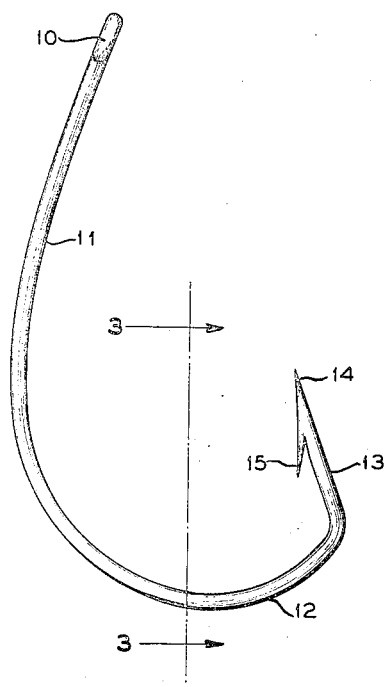

Nov. 28, 1950      C. H. LIEBE      2,531,981
FISHHOOK
Filed Jan. 28, 1949

INVENTOR.
C. H. LIEBE
BY
*A. Yates Dowell*
ATTORNEY

Patented Nov. 28, 1950

2,531,981

UNITED STATES PATENT OFFICE 2,531,981

FISHHOOK

Charles H. Liebe, St. Petersburg, Fla.

Application January 28, 1949, Serial No. 73,249

1 Claim. (Cl. 43—43.16)

This invention relates to the art of fishing, including the tackle used and particularly the character of hook employed for accomplishing the most satisfactory results.

Much has been written and said of the merit of minute differences in structure of equipment of this character and, in actual experience, supposedly identical fishing lines used simultaneously and in almost the same spot have resulted in one on the lines being successful in bringing in fish, while the other was not. The result was probably on account of very slight differences in construction.

Fish hooks ordinarily have had straight shanks and curved lower portions with substantially straight extremities terminating in the hook proper, which was disposed at various angles. The straight portion or end at which the hook proper was disposed has not been in substantial alignment with the eye at the opposite end of the hook and consequently has resulted in pressure not being properly transferred from the line to the hook.

Further, due to the closeness of the hook proper with its barb to the straight shank, unless the hook were presented to the fish or approached from the proper angle substantially lengthwise of the shank, the hook did not enter the mouth of the fish sufficiently to be likely to impale the fish and, this being particularly true of those having bony mouth structure.

Another objection to prior hooks has been that because of the straight shank and curved lower portion generally, the hook has not been substantially in line with the eye at the top of the shank and consequently a strong pull on the line tended to open the hook and release the fish.

It is an object of the invention to provide a fish hook in which the point or impaling portion is substantially in line with the eye of the hook so that the pull will be in the proper direction but with such point extended laterally or slightly out of such line so that when a fishing line having the hook thereon is pulled, the angularly disposed part of the hook will be more likely to come in contact with and pierce and impale the mouth of a fish thereon, instead of following the eye of the hook from the mouth of the fish without impaling the fish.

Another object of the invention is to provide a curved shank and a straight lower end portion terminating in a barb or impaling point, thus providing greater distance between the point of the hook and the shank, so that the hook can enter further into the mouth of a fish, including fish having bony mouth structure and by providing such greater distance accommodate larger fish on the same size hook and thus be more likely to catch or impale a fish thereon.

A further object of the invention is to provide a fish hook of a character which will more readily catch and retain fish thereon and which will be more likely to retain its catch.

The present fish hook reverses much of the old principle of the straight shank and the curved lower portion of the fish hook terminating in a straight portion with an impaling point and heel or barb. Instead it provides a gently curved shank and lower portion which includes a substantially straight end portion terminating in a piercing or impaling point with a barb for retaining the catch. Also, the substantially straight end portion is substantially in line with the eye of the hook although slightly laterally disposed to increase its impaling probabilities.

Figure 2:
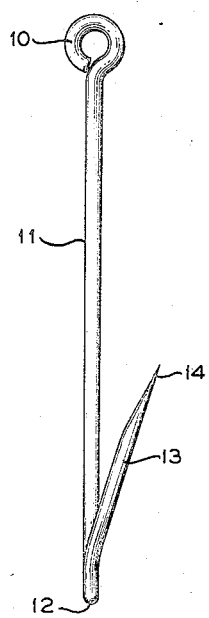

Further objects and advantages of the invention will be apparent from the following description taken in conjunction with the drawings, wherein:

Fig. 1 is a side elevation illustrating one application of the invention;

Fig. 2, a front elevation; and

Figure 3:
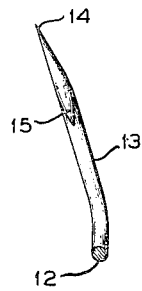

Fig. 3, a section on the line 3—3 of Fig. 1.

With continued reference to the drawings, the hook of the present invention may be attached to a line in any desired manner and for such purpose is provided with the usual eye 10 for attachment of the hook to a line of any desired character.

From the eye 10, the shank 11 is curved gradually to the lower portion 12 of the hook. This curve is a flat, gentle one which becomes increasingly greater, merging abruptly into a relatively straight portion 13 terminating in a piercing or impaling point 14, there being also a retaining barb 15. The hook and impaling point are spaced a substantial distance from the shank, thus providing a relatively wide gap therebetween.

The hook of the present invention is of a configuration such that the straight portion 13 is disposed substantially upwardly in the general direction of the eye 10 and laterally at an angle to the plane of the shank portions and the outer surface of the straight end portion 13 is substantially straight from its end nearest the lower curved portion of the shank 11 to its pointed end, so that when the line carrying the hook is pulled or reeled in, force will be applied in the proper direction to force the point of the hook into a fish contacted in the general direction or line of travel of the hook.

In order to offset any disadvantage by such configuration, as for example when a fish happens to be in a direct line behind the path of travel of the hook so that the hook might travel from the mouth of the fish without impaling the fish thereon, the straight portion 13 is disposed at a slight angle to such line of movement, or to the plane of the shank of the hook, to prevent such action and increase the impaling possibilities.

By utilizing the configuration which applicant has employed, the distance between the point of the hook and the curved shank is increased so that the point of the hook may extend further into the mouth of a fish so that when the fish has a bony mouth structure the possibilities of impaling the fish will be greatly enhanced. An important feature of the invention, as shown in Fig. 2, is that the point 14 is formed by an angular cut across the axis of the straight portion of the hook which causes the tip of the point to be at the right side of each axis and therefore when engaged the impaling point will have a tendency to move laterally of the direction of movement of the eye 10.

It will be obvious to those skilled in the art that various changes may be made in the invention without departing from the spirit and scope thereof, and therefore the invention is not limited by that which is shown in the drawing and described in the specification, but only as indicated in the appended claim.

What is claimed is:

A fish hook comprising a relatively long shank having an eye at its upper end for the attachment of a line, said shank being gently curved from its upper to its lower portions with the curvature along the lower portion progressively increased and abruptly merged into a straight end portion terminating in a barb and an impaling point disposed a substantial distance from said shank and providing a relatively wide gap therebetween, said straight end portion and said impaling point being disposed substantially in a line extending upwardly in the general direction of the eye and laterally at an angle to the plane of the shank portions and one surface of the straight end portion being continuously straight from its end nearest the lower curved portion of the shank to its point end to increase the impaling probabilities of said hook and to cause the point of the hook to be disposed in a position such that when pulled the pulling force will be applied in the general direction of the movement of the point of the hook.

CHARLES H. LIEBE.

REFERENCES CITED

The following references are of record in the file of this patent:

UNITED STATES PATENTS

| Number | Name | Date |
| --- | --- | --- |
| 648,552 | Crane | May 1, 1900 |
| 895,493 | O'Brien | Aug. 11, 1908 |

FOREIGN PATENTS

| Number | Country | Date |
| --- | --- | --- |
| 793 | Great Britain | Jan. 5, 1884 |